United States Patent
Daudi et al.

(10) Patent No.: US 6,505,716 B1
(45) Date of Patent: Jan. 14, 2003

(54) DAMPED DISC BRAKE ROTOR

(75) Inventors: Anwar R. Daudi, Ann Arbor, MI (US); Weston E. Dickerson, Milford, MI (US); Chris Milosavlevski, Livonia, MI (US); Rob Walkowiak, Clinton Township, MI (US)

(73) Assignee: Hayes Lemmerz International, Inc., Northville, MI (US)

( * ) Notice: Subject to any disclaimer, the term of this patent is extended or adjusted under 35 U.S.C. 154(b) by 0 days.

(21) Appl. No.: 09/662,452

(22) Filed: Sep. 14, 2000

Related U.S. Application Data
(60) Provisional application No. 60/163,871, filed on Nov. 5, 1999, and provisional application No. 60/183,446, filed on Feb. 18, 2000.

(51) Int. Cl.[7] .............................................. F16D 69/00
(52) U.S. Cl. .................................................. 188/250 B
(58) Field of Search ...................... 188/218 XL, 251 M, 188/251 R, 251 A, 250 G, 261, 250 E, 269 E, 218 A, 264 A, 264 AA, 250 B, 218 R, 18 R, 73.2, 73.1

(56) References Cited

U.S. PATENT DOCUMENTS

| | | |
|---|---|---|
| 2,719,902 A | 10/1955 | Flynn |
| 2,739,935 A | 5/1956 | Kehl et al. |
| 2,783,411 A | 2/1957 | Matulaitis |
| 3,433,727 A | 3/1969 | Keeleric |
| 3,504,154 A | 3/1970 | Marcolini |
| 3,509,305 A | 4/1970 | Bertolasi |
| 3,655,937 A | 4/1972 | Ullmann et al. |
| 3,800,117 A | 3/1974 | Anderson |
| 3,878,353 A | 4/1975 | Anderson |
| 3,943,321 A | 3/1976 | Pfau et al. |
| 4,107,504 A | 8/1978 | Dinsdale |
| 4,146,770 A | 3/1979 | Dinsdale et al. |
| 4,205,212 A | 5/1980 | Ullmann et al. |
| 4,221,952 A | 9/1980 | Sato et al. |
| 4,229,635 A | 10/1980 | Dinsdale |
| 4,233,485 A | 11/1980 | Sato et al. |
| 4,242,557 A | 12/1980 | Sato et al. |
| 4,251,706 A | 2/1981 | Frei et al. |
| 4,287,403 A | 9/1981 | Sato et al. |
| 4,346,278 A | 8/1982 | Bhattacharyya |

(List continued on next page.)

FOREIGN PATENT DOCUMENTS

| CH | 10 349717 | 12/1960 |
|---|---|---|

OTHER PUBLICATIONS

Fawzy El–Menshawy, Advances in Electro–Discharge Texturing (EDT) for Cold Mill Work Rolls, Iron and Steel Engineer, Aug. 1991, pp. 57–59.

Jorge M. Simao, Electrical Discharge Texturing of Cold Mill Work Rolls Using Different Tool Electrode Materials, Iron and Steel Engineer, Mar. 1996, pp. 42–47.

*Primary Examiner*—Jack Lavinder
*Assistant Examiner*—C. T. Bartz
(74) *Attorney, Agent, or Firm*—Marshall & Melhorn, LLC

(57) ABSTRACT

The invention relates to a brake rotor having improved damping characteristics and a method for producing the same. A surface of the brake rotor is EDG machined, also known as EDM machined, for improving the damping characteristics of the rotor. The decay rate of the brake rotor is increased and the Q factor of the brake rotor is reduced. The portion of the brake rotor which is EDG machined is formed of an electrically conductive material, preferably a ferrous material, more preferably a cast iron material, a gray iron material or a damped iron material. The brake rotor may include a solid friction section or a ventilated friction section. The brake rotor is preferably cast from a single material, although alternatively, it may be a composite rotor formed of more than one material.

2 Claims, 4 Drawing Sheets

U.S. PATENT DOCUMENTS

| | | |
|---|---|---|
| 4,367,391 A | 1/1983 | Furukawa |
| 4,441,004 A | 4/1984 | Inoue |
| 4,471,199 A | 9/1984 | Michishita et al. |
| 4,527,036 A | 7/1985 | Furukawa |
| 4,628,171 A | 12/1986 | Colloy et al. |
| 4,683,364 A | 7/1987 | Anderson |
| 4,697,059 A | 9/1987 | Furukawa |
| 4,819,325 A | 4/1989 | Cross et al. |
| 4,922,076 A | 5/1990 | Cross et al. |
| 4,950,860 A | 8/1990 | El-Mensawy |
| 4,992,639 A | 2/1991 | Watkins et al. |
| 5,089,681 A | 2/1992 | El-Menshawy |
| 5,108,561 A | 4/1992 | Kuromatsu |
| 5,354,961 A | 10/1994 | Diot et al. |
| 5,360,957 A | 11/1994 | Haefner et al. |
| 5,396,040 A | 3/1995 | Girardin |
| 5,451,737 A | 9/1995 | Bertholds et al. |
| 5,453,593 A | 9/1995 | Seok-Yong et al. |
| 5,543,599 A | 8/1996 | Cole et al. |
| 5,750,951 A | 5/1998 | Kaneko et al. |
| 5,922,222 A | 7/1999 | Jens et al. |
| 6,261,153 B1 * | 7/2001 | Dickerson .................... 451/28 |

* cited by examiner

DAMPED DISC BRAKE ROTOR

RELATED APPLICATIONS

This application claims the benefit under 35 U.S.C. 119(e) of U.S. Provisional Application No. 60/163,871, filed Nov. 5, 1999, and Provisional Application No. 60/183,446, filed Feb. 18, 2000, both of which are hereby incorporated herein by reference.

BACKGROUND OF INVENTION

The present invention relates to a vehicle brake rotor and more specifically to a brake rotor having improved vibration damping characteristics.

Wheeled vehicles are typically slowed and stopped with a braking system that generates frictional forces. One known braking system is the disc brake system which includes a rotor attached to one or more of the vehicle wheels for rotation therewith. Rotors typically include a central hat section for attaching the rotor to the vehicle, and an outer friction section having opposite, substantially parallel friction surfaces.

The disc brake assembly further includes a caliper assembly secured to a non-rotating component of the vehicle for moving friction members, such as brake pads, into contact with the rotor friction surfaces. During braking, the brake pads press against the moving rotor friction surfaces creating frictional forces which oppose the rotation of the wheels and slow the vehicle.

Brake rotors are typically cast from an electrically conductive material, preferably a ferrous material such as cast iron or gray iron, and are then machined to achieve the desired dimensions and tolerances. During conventional machining, a tool is pressed against the rotor to remove a portion of the surface of the rotor, such as the friction surface.

Unwanted noise and vibrations are often created during braking with conventionally machined rotors. The disc brake system components, such as the caliper and brake pads, vibrate during braking. This vibrational energy is transferred to the rotor which is also known as exciting the rotor. The excited rotor vibrates with the greatest amplitude at or near it's resonant frequencies producing undesirable audible noises such as "squeal".

It is desirable to increase the damping of the rotor to reduce the noise and vibration from the rotor during braking.

SUMMARY

The invention relates to a brake rotor having improved damping characteristics and a method for producing the same. The brake rotor includes a friction section having a friction surface for interfacing with a brake component such as a brake pad during braking. A surface of the brake rotor is EDG machined, also known as EDM machined, for improving the damping characteristics of the rotor. The decay rate of the brake rotor is increased and the Q factor of the brake rotor is reduced.

The portion of the brake rotor which is EDG machined is formed of an electrically conductive material, preferably a ferrous material, more preferably a cast iron material, a gray iron material or a damped iron material. The brake rotor may include a solid friction section or a ventilated friction section. The brake rotor is preferably cast from a single material, although alternatively, it may be a composite rotor formed of more than one material.

A method for improving a brake rotor's damping characteristics, includes increasing the decay rate and/or reducing the Q factor by EDG machining or EDM machining a surface of the rotor. The EDG or EDM machining preferably includes providing at least one electrode and reducing the distance between the electrode and the rotor surface until one or more sparks extend therebetween. The surface is preferably the friction surface although any suitable surface of the brake rotor may be EDG or EDM machined to improve the rotor's damping characteristics.

DETAILED DESCRIPTION OF THE PREFERRED EMBODIMENT

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
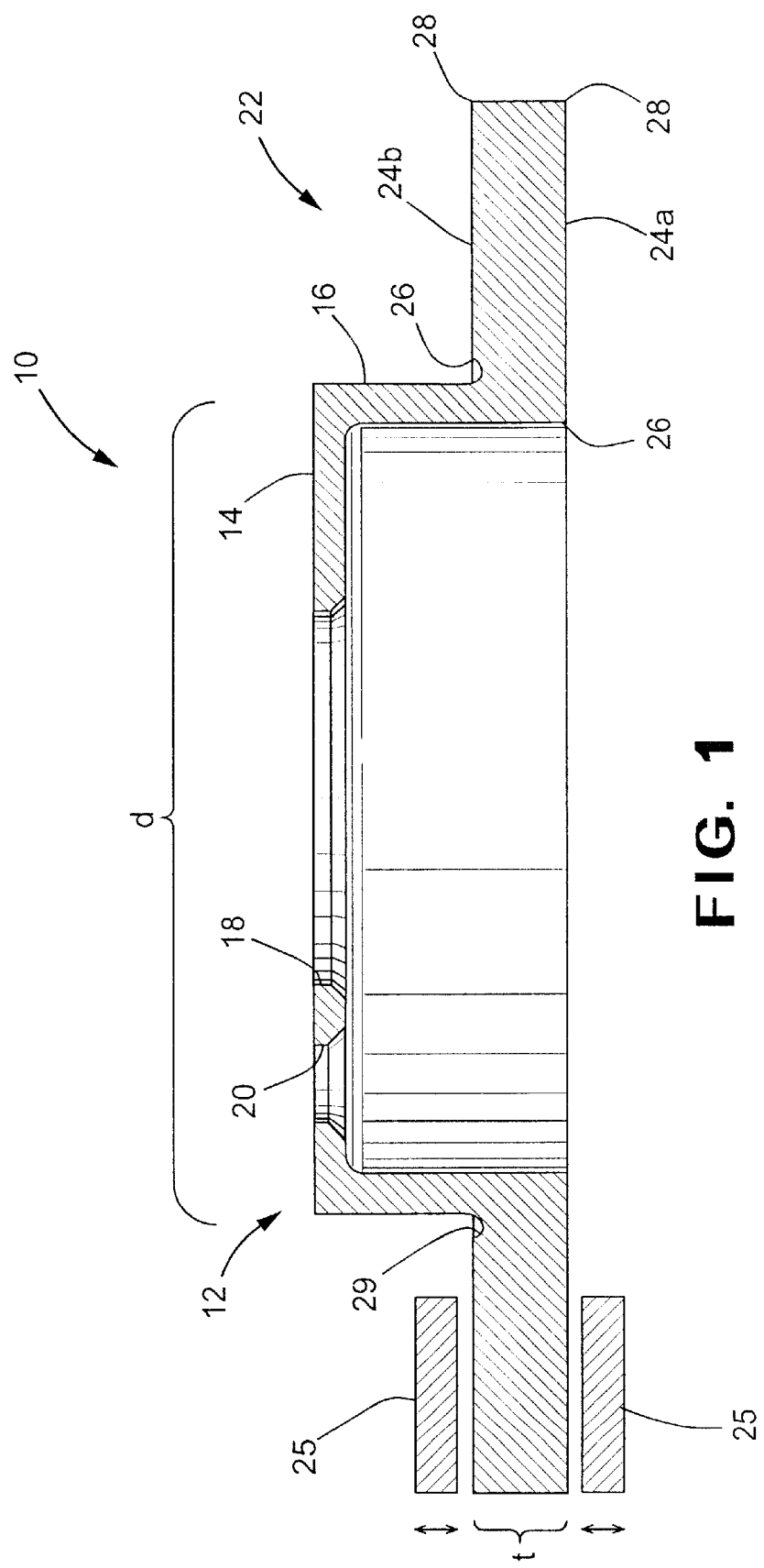
FIG. 1 is a cross sectional elevational view of a brake rotor formed in accordance with the invention.

The invention relates to improving the damping characteristics of a disc brake rotor, such as the rotor illustrated generally at 10 in FIG. 1. The rotor 10 includes a radially inner hub portion 12 having a central mounting section 14 for mounting the rotor on an associated drive member (not shown), such as a spindle or vehicle axle. A hat wall 16 extends from the periphery of the mounting section 14. The hat wall 16 may be straight and cylindrical, extending at a right angle from the mounting section 14. Alternatively, the hat wall, or portions of it, may be inclined forming a portion of a cone, or it may be curved. The central mounting section 14 has a central pilot aperture 18, in which the drive member is closely received. Fastener apertures 20 are formed in the central mounting section 14 for receiving fasteners to secure the rotor to the vehicle (not shown).

The rotor 10 also includes a radially outer annular friction section 22 having opposite friction surfaces 24, including an inboard friction surface 24a and an outboard friction surface 24b. The friction surfaces 24a, 24b interface with associated friction members 25, such as brake pads or the like. The annular friction section 22 of the rotor 10 has a radially inner edge 26 and a radially outer edge 28. An annular groove 29 is preferably disposed adjacent the hat wall 16 at the radially inner edge 26 of the friction section 22. The rotor 10 is known as a solid rotor.

Figure 2:
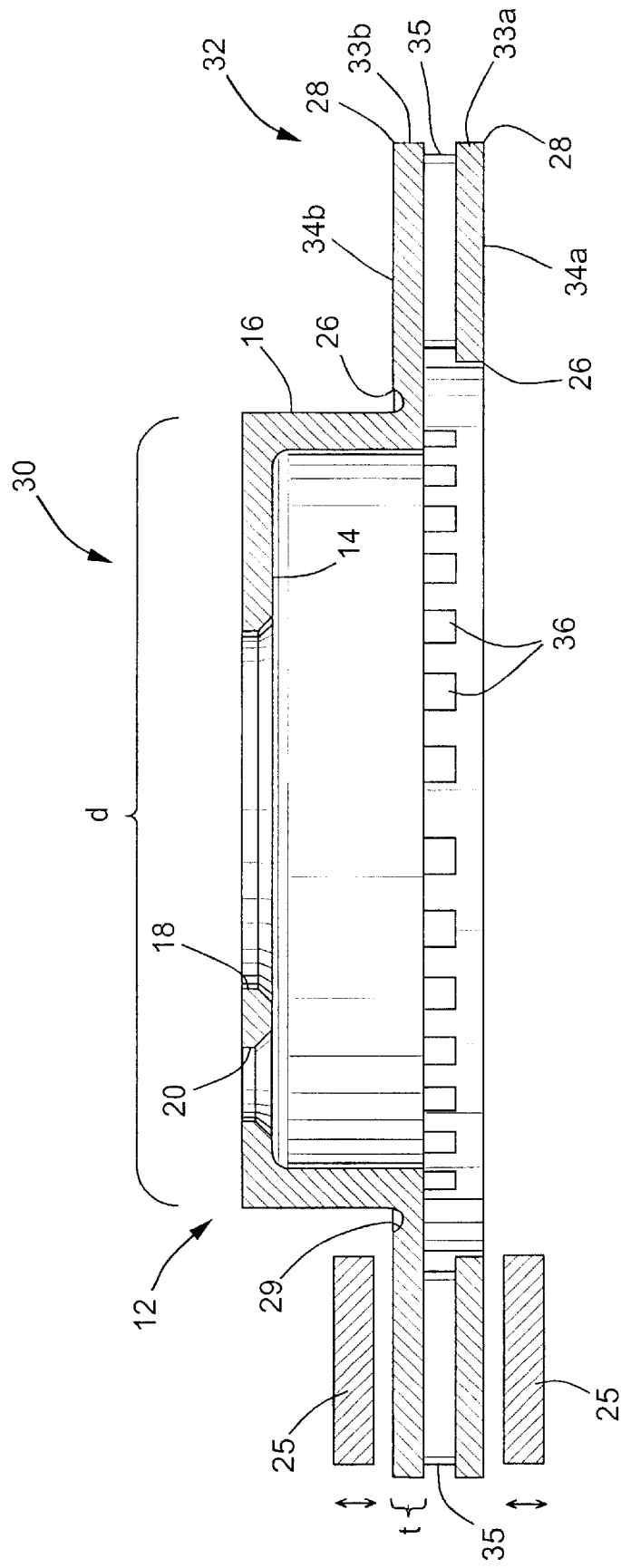
FIG. 2 is a cross sectional elevational view of an alternate embodiment of a brake rotor formed in accordance with the invention.

Referring now to FIG. 2, a second embodiment of the rotor is illustrated at 30. The rotor 30 is similar to the rotor 10 with identical features or components referred to using the same reference numerals as the rotor 10 shown in FIG. 1. The rotor 30, however is a ventilated rotor having a friction section 32 including a pair of braking plates disposed in a mutually parallel, spaced apart relationship. The braking plates include an inboard braking plate 33a and an outboard braking plate 33b. Friction surfaces, including an inboard friction surface 34a and an outboard friction surface 34b, are disposed on the outwardly facing surfaces of the braking plates 33a and 33b respectively.

The ventilated rotor includes fins 35 connecting the braking plates 33a and 33b together thereby defining vents 36 between the braking plates for providing cooling airflow between the braking plates as the rotor turns. Optional axially extending vents (not shown) may extend through the friction section 22 or 32 of either rotor 10 or 30 to provide for additional cooling.

The rotors in FIGS. 1 and 2 are shown for illustrative purposes and should not be considered limiting as the invention described herein can be applied to any known rotor formed of any suitable electrically conductive material including but not limited to cast iron, gray iron and damped iron. The rotor is preferably formed entirely of the same material. Although, alternatively, the rotor may be a composite rotor formed of more than one material, with the portion being EDG machined being formed of the electrically conductive materials described above.

The rotors 10 and 30 are preferably cast in a conventional manner to produce a rotor casting having physical dimensions which are close to the desired final dimensions. The rotor surfaces, preferably the friction surfaces 24a, 24b, are then machined to the desired dimensions using Electric Discharge Machining (EDM), also referred to as Electric Discharge Grinding (EDG). An example of an EDG machining method and apparatus for machining surfaces, such as the friction surface, of rotors is disclosed in U.S. patent application Ser. No. 09/193,063 which is hereby incorporated herein by reference. However, any suitable, known form of EDG or EDM machining may be used, including rotary or stationary electrical discharge machining.

The EDG machined rotor may additionally be conventionally machined before and/or after EDG machining. For example, the friction surfaces 24a, 24b may be subjected to a rough machining step using conventional machining prior to EDG machining. Additionally, other portions of the rotor apart from the friction section may be conventionally machined.

The rotors 10 and 30 are formed of an electrically conductive material, preferably a ferrous material, more preferably cast iron, and still more preferably gray iron. For example, the rotors 10 and 30 may be formed of a hypereutectic iron, also known as damped iron, having a carbon equivalent (hereinafter C.E.) of greater than 4.3%. The rotors have a minimum tensile strength of 21,750 psi, 150 Mpa. The damped iron composition includes:

| C.E. | 4.3–4.6 |
| Carbon | 3.7–3.90 |
| Silicon | 1.9–2.3 |
| Manganese | 1.7 × S + 0.3 min to 0.8% |
| Sulfur | 0.07–0.15 |
| Phosphorus | 0.03 to 0.09% |
| Nickel | 0.10% max |
| Chromium | 0.04–0.25% |
| Molybdenum | 0.08% max |
| Copper | 0.04–0.25% | and trace amounts of aluminum, titanium, tin, lead and antimony. However, this damped iron composition should not be considered as limiting and any suitable damped iron composition may be used.

Alternatively, the rotors may be formed of any other suitable gray iron, including cast iron having a C.E. between 3.7 and 4.3%. An example of a suitable cast iron composition includes:

| Manganese | min. (calculated as 1.7(% S) + 0.3) |
| Sulfur | 0.17 max. |
| Carbon | 3.25–3.65 |
| Silicon | 1.6–2.4 |
| Phosphorus | 0.12 max. |
| Chromium | 0.4 max. |

However, this cast iron composition should not be considered as limiting and any suitable cast iron composition may be used.

The EDG machined rotors are machined using an EDG apparatus including one or more electrodes connected to one or more power supplies. The rotor is mounted to the EDG apparatus thereby providing an electrical path from the rotor to ground. The distance between the surface of the rotor being machined, preferably the friction surfaces 24a, 24b, 34a, 34b, and the electrode is reduced until the gap therebetween breaks down and an electrical discharge or spark extends between the electrode and the surface of the rotor. The spark creates a high temperature of approximately 10,000 to 12,000 degrees Celsius at the rotor surface. The high temperature vaporizes a portion of the metal of the rotor surface. A series of sparks directed at different locations on the rotor surface vaporize portions of the rotor surface until the entire rotor surface is machined to the desired dimensions. While it is preferable to machine the friction surface of the rotor, other rotor surfaces may also be EDG machined to improve the damping characteristics of the rotor. The manner in which the rotor is EDG machined should not be considered as limiting the scope of the invention, as the rotor may be machined using any known EDG or EDM machining technique to improve it's damping characteristics.

The EDG machined rotors 10 and 30 exhibit significantly improved damping characteristics over rotors of the same size, shape and iron composition which were not EDG machined. The damping characteristics of a rotor can be characterized by the decay rate D of the rotor, which indicates how the intensity or amplitude of the sound energy emitted by an excited rotor attenuates over time. Based on the mathematical model that best describes the decay in amplitude of a sine wave, D can be expressed by the equation:

$$D = -20 \log_{10}(A/A_o)/t$$

where A is the amplitude at time t, $A_o$, is the amplitude at t=0. The decay rate D is measured in dB/second. It is desirable for a rotor to have a high decay rate so that when the rotor is excited by a stimulus, such as a brake pad, the amplitude of the rotor's vibrations attenuate quickly. A rotor having a high decay rate will be less likely to exhibit "squeal" and other undesirable noise and vibrations during braking.

The Q factor is a concept that is used regularly in the field of mechanical vibrations to describe the sharpness of resonance. The Q factor can be expressed by the equation:

$$Q = (27.3 \times f)/D$$

where f is the resonant frequency of the rotor. It is desirable for a rotor to have a low Q so that when the rotor is excited by a stimulus, such as a brake pad, the amplitude of the rotor's vibrations attenuate quickly. A rotor having a low Q will also be less likely to exhibit "squeal" and other undesirable noise and vibrations during braking.

It has been found that EDG machining the rotor surface, preferably the friction surfaces, increases the damping characteristics of the rotor by increasing the decay rate D and lowering the Q factor as compared to rotors which were only conventionally machined using physical contact with a tool. Tests were made comparing the decay rate and the Q factor of rotors having friction surfaces 24a, 24b, 34a, 34b machined by conventional machining techniques and rotors having friction surfaces machined by EDG. Both solid rotors and ventilated rotors were tested. For consistency in comparison, the rotors which were EDG machined had the same shape, and were cast using the same casting methods and from gray iron having the same composition as the comparable conventionally machined rotors.

Figure 3:
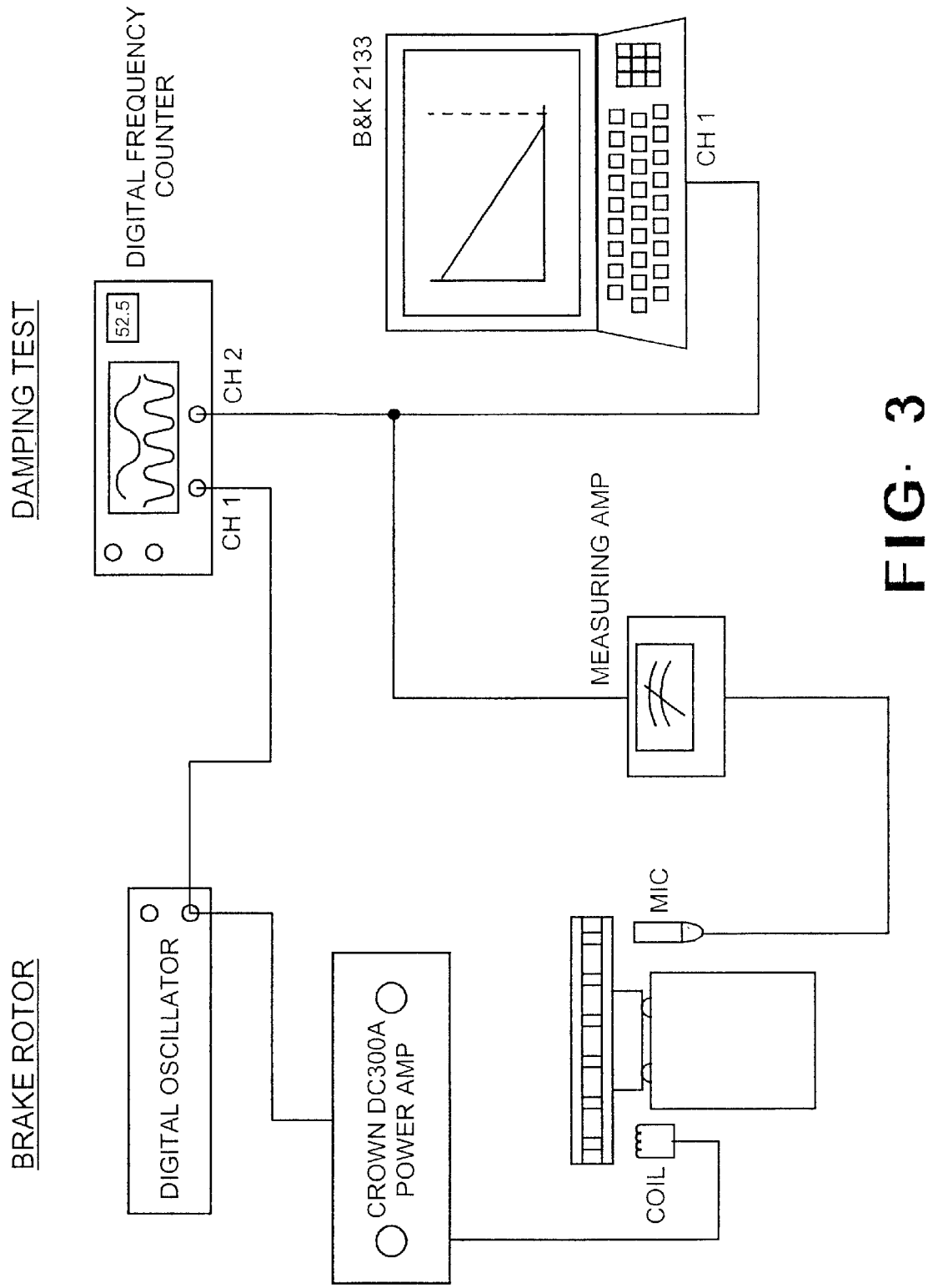
FIG. 3 is a block diagram illustrating the method of testing the brake rotor.

Referring now to FIG. 3, a diagram illustrating the test apparatus is shown. An oscillator, power amplifier and coil were used to excite the rotor during testing. The sound energy emitted by the excited rotor was received by a microphone and converted to electrical signals. The microphone was connected to a oscilloscope/frequency counter and analyzer. The oscillator was tuned to find the resonant frequency of the rotor which was recorded.

Next, the oscillator which was tuned to the resonant frequency was turned off thereby triggering the analyzer. The analyzer measured the decaying signal emitted by the excited rotor and the decay rate of the rotor was determined. The Q factor was then determined using the resonant frequency and the decay rate based on the equation described above.

Each rotor was measured for decay rate and resonant frequency at different positions spaced circumferentially around the friction surface. The results were averaged and are listed in table 1.

TABLE I

| Rotor | Dimensions | Decay Rate (dB/Sec) | Resonant Frequency (Hz) | Q Factor | Damping Factor $\zeta = 1/(2Q)$ |
|---|---|---|---|---|---|
| ventilated conventionally machined damped iron (43187-4AD) | d = 30.16 cm<br>t = 2.82 cm | 44.72 | 847.82 | 517.52 | 0.00097 |
| ventilated conventionally machined damped iron (43187-4AD) | d = 30.16 cm<br>t = 2.82 cm | 34.30 | 845.78 | 673.08 | 0.00074 |
| ventilated EDG machined damped iron (43187-4edm/ground) | d = 30.16 cm<br>t = 2.82 cm | 189.47 | 866.64 | 124.87 | 0.0040 |
| ventilated EDG machined damped iron (43187-5edm/ground) | d = 30.16 cm<br>t = 2.82 cm | 134.99 | 873.25 | 176.60 | 0.00283 |
| ventilated EDG machined damped iron (43187-4edm/afterturn) | d = 30.16 cm<br>t = 2.82 cm | 199.83 | 861.31 | 117.67 | 0.00416 |
| solid conventionally machined cast iron (42260) | a = 25.72 cm<br>b = 1.40 cm | 33.90 | 1070.06 | 892.08 | .00056 |
| solid EDG machined cast iron (42260) | a = 25.72 cm<br>b = 1.40 cm | 58.79 | 1060.50 | 493.11 | .00101 |

The test results indicate that the ventilated EDG machined rotors had decay rates of 189.47 dB/sec and 134.99 dB/sec as compared to the conventionally machined ventilated rotor decay rates of 44.72 dB/sec and 34.30 dB/sec. The decay rates of the EDG machined ventilated rotors were increased between 300 and 550 per cent over the conventionally machined ventilated rotors.

The Q factor of the EDG machined ventilated rotors were 124.87 and 176.60 as compared to the conventionally machined ventilated rotor Q factors of 673.08 and 517.52. The Q factors of the EDG machined ventilated rotors were between 65 and 82 per cent lower than the conventionally machined ventilated rotors.

After testing rotor part no. 43187-4edm/ground, a rotor having and EDG machined friction surface, the friction surface of the rotor was then machined on a conventional machining apparatus, specifically a lathe. This part, now referred to as part number 43187-4edm/afterturn had 0.0102 cm taken off each friction surface and was then tested again using the testing method described above. This rotor had a decay rate of 199.83 dB/sec and a Q factor of 117.67 indicating that the damping effects of EDG machining are still pronounced even after portions of the EDG machined surface are removed using conventional machining. The 0.0102 cm taken off with conventional machining is provided by way of example and should not be considered as limiting. Any suitable amount of material, including amounts as low as 0.00254 cm may be removed by conventional machining while still providing comparable damping effects. While the ventilated rotors were made of damped iron, any ventilated rotor comprised of any suitable cast iron including gray iron will show improvements in the damping characteristics due to EDG machining as described herein.

The EDG machined solid rotor had a decay rate of 58.79 dB/sec as compared to the conventionally machined solid rotor decay rate of 33.90 dB/sec. The decay rate of the EDG machined solid rotor was over 73 per cent higher than the decay rate of the conventionally machined solid rotor.

The Q factor of the EDG machined solid rotor was 493.11 as compared to the conventionally machined solid rotor Q factor of 892.08. The Q factor of the EDG machined solid rotor was 45 per cent lower than the Q factor of the conventionally machined solid rotor. While the solid rotors were made of cast iron, any solid rotor comprised of any suitable gray iron including damped iron will show improvements in the damping characteristics due to EDG machining as described herein.

A second test was performed on another group of brake rotors comparing the effects of EDG and conventional machining on the same rotor. A solid rotor of a similar size and cast iron composition as the solid rotor described above was tested. The rotor friction surfaces were conventionally machined and the decay rate and Q factor were determined using the method described above. Afterwards, the friction surfaces of the same rotor were EDG machined and the decay rate and Q factor were determined again. The results of this test are shown in Table II below.

TABLE II

|  | after conventional machining | | after EDG machining | |
| --- | --- | --- | --- | --- |
|  | Decay Rate (dB/Sec) | Q Factor | Decay Rate (dB/Sec) | Q Factor |
| solid rotor cast iron (42260) | 24.75 | 1193.73 | 76.16 | 382.06 |

The decay rate of the cast iron rotor with solid friction section that was EDG machined after being conventionally machined was improved, being increased more than 300% over the decay rate of the rotor after it was only conventionally machined as described above. The Q factor of the rotor which was EDG machined after being conventionally machined was also improved, being reduced by approximately 68% over the decay rate of the rotor after it was only conventionally machined as described above.

A ventilated rotor 30 of approximately the same size as the ventilated rotor described above, but formed of a cast iron composition similar to the solid rotor 10 described above, was also tested in a similar manner. The rotor friction surfaces were conventionally machined and the decay rate and Q factor were determined using the method described above. Afterwards, the friction surfaces of the same rotor were EDG machined and the decay rate and Q factor were determined again. The results of this test are shown in Table III below.

TABLE III

|  | after conventional machining | | after EDG machining | |
| --- | --- | --- | --- | --- |
|  | Decay Rate (dB/Sec) | Q Factor | Decay Rate (dB/Sec) | Q Factor |
| ventilated rotor cast iron | 26.60 | 1204.67 | 98.29 | 322.07 |

The decay rate of the cast iron rotor with ventilated friction section that was EDG machined after being conventionally machined was improved, being increased more than 360% over the decay rate of the rotor after it was only conventionally machined as described above. The Q factor of the rotor which was EDG machined after being conventionally machined was also improved, being reduced by approximately 73% over the decay rate of the rotor after it was only conventionally machined as described above.

It has also been found that EDG machining the rotor surface, preferably the friction surfaces, increases the damping characteristics of the rotor by increasing the decay rate D and lowering the Q factor as compared to rotor castings which were not previously conventionally machined using physical contact with a tool. A ventilated rotor 30 similar in size to the ventilated rotor described above and formed of the damped iron composition described above was tested to compare improvements in damping from EDG machining with the damping of the original raw casting. The decay rate and Q factor of the rotor as cast were determined using the testing method described above. Then the friction surfaces of the rotor casting were EDG machined as described above. The EDG machined rotor was then tested again to determine the decay rate and Q factor. The results of these tests are shown in Table IV below.

TABLE IV

|  | after casting | | after EDG machining | |
| --- | --- | --- | --- | --- |
|  | Decay Rate (dB/Sec) | Q Factor | Decay Rate (dB/Sec) | Q Factor |
| ventilated rotor damped iron | 56.00 | 437.50 | 184.11 | 130.52 |
| ventilated rotor damped iron | 55.64 | 451.08 | 164.93 | 146.42 |

The decay rate of the damped iron rotors with ventilated friction sections were also improved with EDG machining. The decay rate of the rotors which were EDG machined after being conventionally machined was improved, being increased between 295% and 325% over the decay rates of the rotors after they were only conventionally machined as described above. The Q factor of the rotors after being EDG machined was also improved, being reduced by between 67% and 70%.

Another set of solid rotors and ventilated rotors, were tested using a second testing method. Again, for consistency in comparison, the same gray iron compositions and casting methods were used to form the rotor castings. The rotors with conventionally machined friction surfaces were compared with rotors having EDG machined friction surfaces.

Each of the rotors was suspended on a string that was looped through a hole in the rotor. The hanging rotor vibrates nearly independently of the string support and it is called freely suspended because it allows the rotor to vibrate in its free-free modes. The vibration damping then is only the result of the damping of the rotor material and a small contribution from air.

The hanging rotor was struck with an impact hammer that has a force gager in its nose. The subsequent vibrations of the rotor were measured by a small accelerometer attached to the surface of the rotor. The accelerometer measures vibration perpendicular to the rotor surface. The time history of the impact force and the rotor response were digitally recorded and a spectral analysis was performed. The results of these tests are shown in Table V below.

TABLE V

| Rotor | Dimensions | Decay Rate dB/msec | Natural Frequency | Damping Factor $\zeta$ | Q Factor $(Q = 1/(2\zeta))$ |
| --- | --- | --- | --- | --- | --- |
| ventilated conventionally machined #1 | a = 30.16 cm<br>b = 2.82 cm | 85.3 | 853.1 | 0.00183 | 273. |
| ventilated EDG #2 | a = 30.16 cm<br>b = 2.82 cm | 187.8 | 846.0 | 0.00406 | 123. |
| solid conventionally | a = 25.72 cm<br>b = 1.40 cm | 85.3 | 1081. | 0.00144 | 346. |

TABLE V-continued

| Rotor | Dimensions | Decay Rate dB/ msec | Natural Frequency | Damping Factor ζ | Q Factor (Q = 1/(2ζ)) |
|---|---|---|---|---|---|
| machined #3 solid EDG #4 | a = 25.72 cm b = 1.40 cm | 106.4 | 1052. | 0.00185 | 270. |

Rotors #1–#4 had a portion of the friction section removed which affected the results, however increased decay rates and reduced Q factors were measured as shown in Table II.

Figure 4:
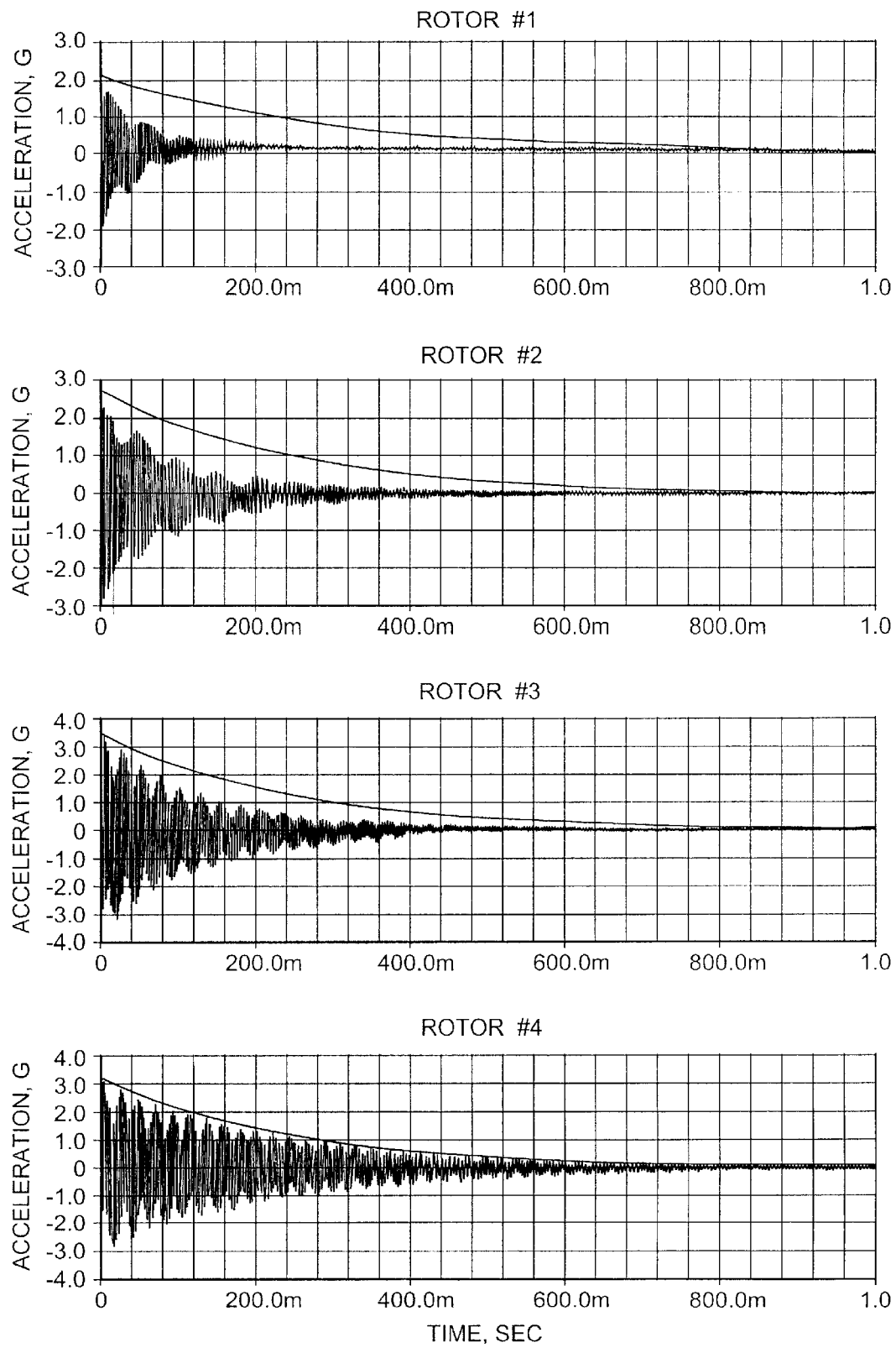
FIG. 4 is graph of the damping of several rotors illustrating the improved damping characteristics of the rotors formed in accordance with the invention.

FIG. 4 shows the time history of decay of rotor vibrations for rotors #1–#4. The faster the vibrations decay, the higher the damping. The decay rate of the EDG machined ventilated rotor #1 was increased about 200 per cent over the decay rate of the conventionally machined ventilated rotor #2. The decay rate of the EDG machined solid rotor #3 was increased about 28% over the EDG machined solid rotor #4. The Q factors were lowered comparatively as shown.

In accordance with the provisions of the patent statutes, the principles and mode of operation of this invention have been described and illustrated in its preferred embodiment. However, it must be understood that the invention may be practiced otherwise than specifically explained and illustrated without departing from its spirit or scope.

We claim:

1. A method of improving the damping characteristics of a brake rotor comprising:

machining a surface of a brake rotor via contact with a conventional machining tool prior to providing at least one electrode and providing at least one electrical discharge between said at least one electrode and the surface of said brake rotor.

2. A method of improving the damping characteristics of a brake rotor comprising:

machining a surface of a brake rotor via contact with a conventional machining tool after providing at least one electrode and providing at least one electrical discharge between said at least one electrode and the surface of said brake rotor.

* * * * *